April 22, 1958    D. L. ANDERSON ET AL    2,831,519
SMEAR REMOVER FOR POWER MEAT SAWS
Filed March 30, 1953    2 Sheets-Sheet 1

INVENTORS
DALE L. ANDERSON
PAUL F. SHAFFER
EDWARD M. HARWELL
ROBERT H. KNOWLES
EUGENE F. NASH
BY
ATTORNEYS

April 22, 1958     D. L. ANDERSON ET AL     2,831,519
SMEAR REMOVER FOR POWER MEAT SAWS
Filed March 30, 1953     2 Sheets-Sheet 2
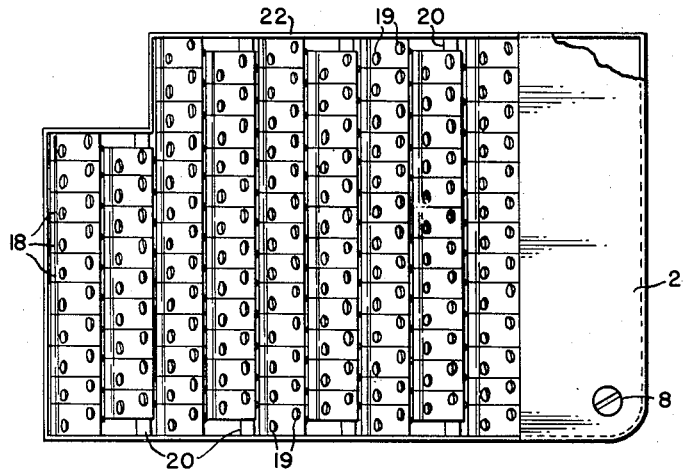
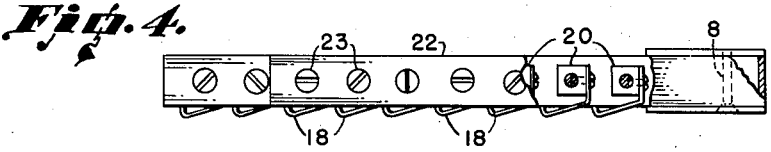
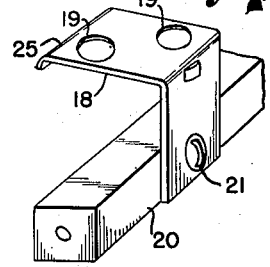
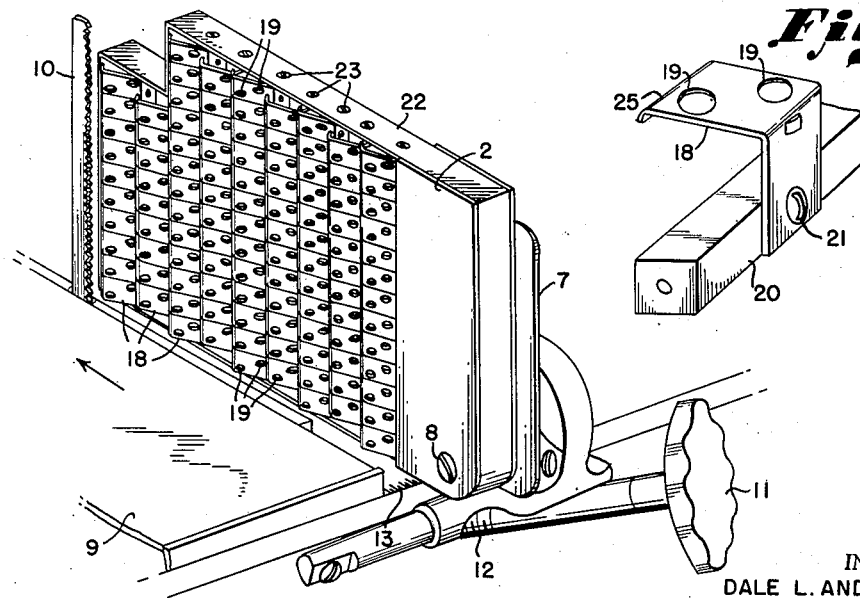
INVENTORS
DALE L. ANDERSON
PAUL F. SHAFFER
EDWARD M. HARWELL
ROBERT H. KNOWLES
EUGENE F. NASH
BY
ATTORNEYS

2,831,519

SMEAR REMOVER FOR POWER MEAT SAWS

Dale L. Anderson and Paul F. Shaffer, Miami Springs, and Edward M. Harwell and Robert H. Knowles, Coral Gables, Fla., and Eugene F. Nash, Atlanta, Ga., assignors to the United States of America as represented by the Secretary of Agriculture Application March 30, 1953, Serial No. 345,328

15 Claims. (Cl. 146—88)

A non-exclusive, irrevocable, royalty-free license in the invention herein described, for all governmental purposes, throughout the world, with the power to grant sublicenses for such purposes, is hereby granted to the Government of the United States of America.

This invention relates to improvements in power saws used for obtaining retail-size cuts of meat.

The use of such saws in breaking down various types of meats into retail cuts results in a residue of bone and fat particles being left on the face of both sides of the retail cut. This bone and fat smear has three objectionable features, namely: (1) It detracts from the appearance of the meat, frequently leaving the cut in an unsalable condition; (2) It speeds up bacterial growth; and (3) It increases and speeds up discoloration of the meat surface.

The smear that results from the use of the power saw is usually removed by hand by the use of a wiping cloth, a knife, or a meat scraper. This function is generally performed as a separate operation after a number of retail cuts have been made on the power saw.

One object of the invention, therefore, is to provide a smear remover which will remove the old fat and bone particles from the outer surface of the meat as it is being cut, thereby eliminating the additional time-consuming and unsanitary procedures formerly required to clean the surface of the cut.

Another object of the invention is to provide a smear remover which will also function as a space guide for the purpose of regulating the thickness of the cut.

Other objects will become apparent from the following description of the invention and the accompanying drawings.

In the drawings:

Figure 2 shows a modification of the smear remover of this invention, and further illustrates a method of mounting it on the saw table as well as the means for regulating the thickness of cut.

Figure 3 is a face view of the modification shown in Figure 2.

Figure 4 is a top view of the modification shown in Figure 3.

Figure 6 shows the details of construction of one of the spring scraper elements of the modification of Figure 2 and how it is mounted.

Figure 1:
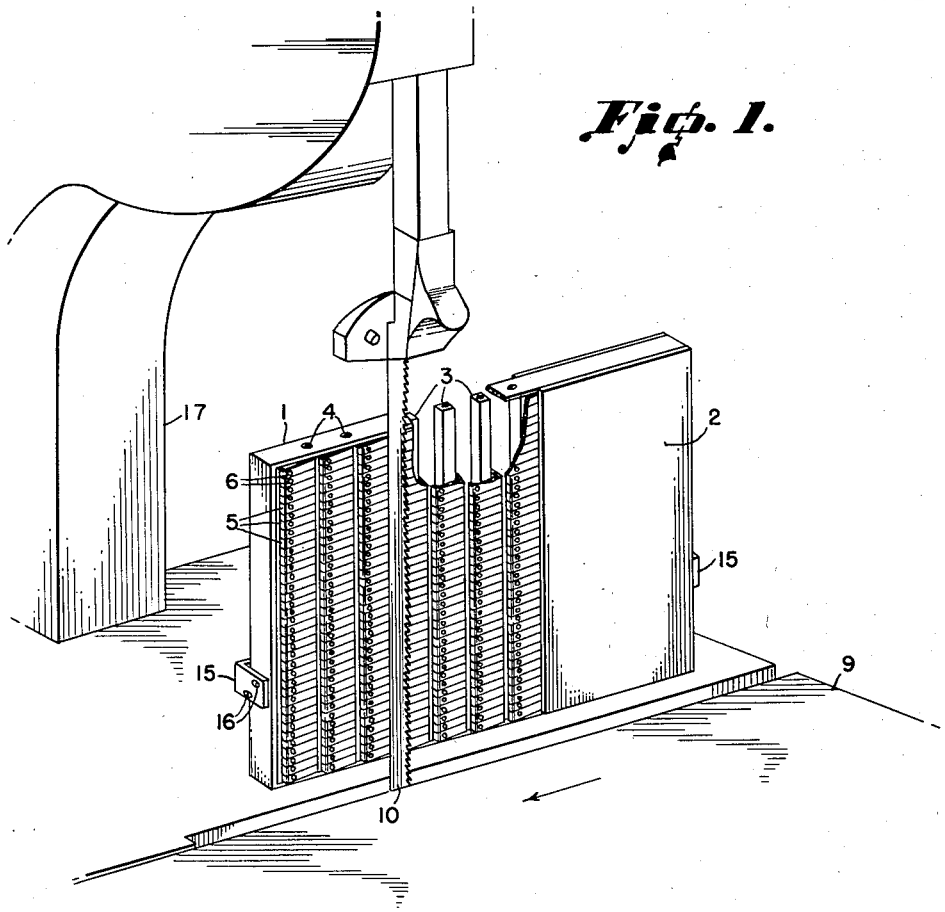
Figure 1 shows the smear remover assembled on a conventional power meat saw.

As shown in Figure 1, the novel smear remover consists of a frame or holder 1 having a flat guide surface 2 and an open portion in which are mounted a series of parallel bars or spines 3. These spines are secured in the holder by means of screws 4. The bars serve as supports for a series of leaf-type spring finger elements or tines 5, each of which is provided with a hole 6 and a leading edge 24. These holes function as the scraping edges for removing the bone and fat smears from the outer surface of the meat. In use, the device may be secured to the usual space guide plate 7 (invisible in Figure 1, but shown in Figure 2) provided with the saw assembly housing 17. The meat to be cut is placed on the movable saw platform 9 which carries the meat to saw blade 10. Thickness of cut may be regulated by adjusting the position of the smear remover with respect to the saw blade. The smear remover thus functions as a gauging panel similarly to space guide plate 7. This is accomplished by turning knob 11 which operates gear assembly 12. See Figure 2. The actual thickness may be read on the calibrated edge of the stationary portion of the saw platform 13. The holes for horizontally successive rows of springs are offset to permit wiping of the entire outer surface of the cut as it advances in the direction shown in Figures 1 and 2. Each individual spring finger element operates separately from the vertical bar, to which it is attached by means of screw 14.

The device may be constructed in two functionally equivalent variations. As shown in Figure 1, the individual finger elements are provided with only one hole each and the entire frame or holder is secured to the space guide plate by means of clamp 15 and screws 16.

In the modification shown in Figures 2 and 3, the finger elements or tines 18 are provided with two holes each, such as holes 19, as well as leading edge 25. As in the modification of Figure 1, the finger elements are individually mounted on spines 20 by means of a screw 21. Also, as in the modification of Figure 1, these spines are secured in holder 22 by means of screws 23. This holder is designed substantially the same as holder 1, and is also provided with a flat guide surface 2. However, instead of merely clamping over space guide 7, as in Figure 1, holder 22 is bolted to the space guide by means of screw 8.

As pointed out above, both modifications are functionally equivalent in that the finger elements provide a meat bearing surface and the edges of the holes serve to scrape the smear from the cut surface of the meat. As shown in Figure 4, the parallel rows of finger elements form with each other a series of ridges.

Figure 5:
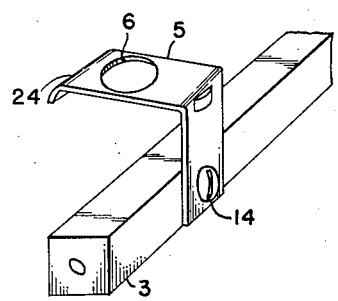
Figure 5 shows the details of construction of one of the scraper elements of the smear remover shown in Figure 1 and how it is mounted.

In the modification having only one hole in each finger element, Figures 1 and 5 show the hole located approximately midway the width of the finger. In both modifications, Figures 1, 2, and 3 show the length of each finger to be approximately equal to the distance between the parallel rows of spines.

We claim:

1. A smear removal means for a meat slab or chunk comprising a meat bearing member having a plurality of flat surfaces laterally spaced over its area between the ends thereof and in successively disposed relation to each other along straight lines extending between said ends, said flat surfaces being adapted on placement and pressure of meat thereagainst to withstand said pressure and slidably engage the meat, said meat bearing member having in each of said flat surfaces thereof an edge facing one end of the member and in transverse relation to a straight line extending between the member ends and an opening adjacent said edge and on the side thereof most proximate one end and providing a space into which a limited area of the meat may bulge to occupy a position extending across said edge in response to the application of pressure to the meat for guiding and moving the same, and whereby movement of the meat over said flat surfaces toward the other end of the member causes each bulging meat face area to engage and be scrapingly drawn over an edge and out of an opening, removing smear from that meat face area and permitting adjacently successive meat face areas to successively bulge into said openings for successive engagement of said edge and removal of smear.

2. A smear removal means for a meat slab or chunk comprising a holder and a unit having a lineally extending spine in connecting engagement with said holder and a plurality of flexible tine elements resiliently depending from and extending in parallel relation from successive spaced points along one of the longer sides of said spine in a normal angular relation thereto, each of said tine elements having an elongated substantially flat surface in plane with the corresponding surface of the other said tine elements and adapted for slidable and pressing engagement with a smear containing face of a meat slab or chunk whereby the tine elements and meat slab or chunk may be guided in relative movement and said meat slab or chunk may be compressed in distributed regions of tine engagement, each tine element having a single circular opening at a point on said flat surface and proximate the end thereof remote from said spine, said opening providing an arcuate edge on each tine element in plane with said flat surface and in a facing spaced relation thereto, the diameter of each said opening allowing a limited area of a smear containing meat face in the compressed regions of the meat slab or chunk to expand between said flat surface and edge and bulge to one side of the common plane thereof and thus extend across said edge, whereby the relative movement of the tine elements and meat slab or chunk in a direction across the flat surfaces toward their aforesaid edges causes the bulging meat face areas in the openings of the tine elements to engage and be drawn scrapingly over said edges of the tine elements and back from one side of the common plane of said flat surfaces and edges toward and into said plane, removing smear simultaneously from said meat face areas and permitting adjacently successive meat face areas to successively expand and bulge between said flat surface and edges for successive removal of smear therefrom to effect, in a single pass of the meat slab or chunk relative to the unit, smear removal from a succession of meat face areas having strip or band continuity and outline.

3. The smear removal means for a meat slab or chunk described in claim 2 having a second unit having the described spine and tine elements and being in connecting engagement with said holder in a tandem relation to said first mentioned unit, the tine elements of the second unit being laterally offset to the tine elements of the first mentioned unit, whereby the tine elements of the second unit engage and compress regions of the meat slab or chunk spaced from the regions engaged and compressed by the tine elements of the first mentioned unit and the edges of the itne elements of said second unit remove smear from a succession of areas of the meat face having a strip or band continuity and outline extending in overlapping relation to the areas from which the tine elements of said first mentioned unit remove smear.

4. In combination with a power meat cutting machine having a housing and a cutter movably mounted on said housing, a slice gauging panel on said housing adapted to engage and guide meat into operative relation with said cutter and having a plurality of metal strips in engagement with spaced points on said panel, each strip having a flat surface with dimensions approximately equal to the distance between said spaced points and in a relation to the corresponding flat surfaces of the other strips to form a laterally extending meat bearer area therewith, each strip having a single opening in its flat surface and providing space into which meat moving over said meat bearer area to engage the cutter may protrude and an edge on one side of said opening against and over which the protruding meat may be successively drawn to remove smear therefrom as the meat continues movement toward said cutter.

5. In combination with a power meat cutting machine having a housing and a cutter movably mounted on said housing, a meat slice gauging panel on said housing adapted to engage and guide meat into cutting relation with said cutter and having a plurality of substantially lineally extending spine parts in engagement with said panel, each spine part being parallel to and in successive tandem relation with the other spine parts and having a plurality of resiliently dependent and parallel finger elements along one of its longer sides, each element having a flat surface with dimensions approximately equal to the distance between alternate elements of the same and alternate spine parts on the panel and in a relation to the corresponding flat surfaces of the other elements to form with said other element flat surfaces a laterally extending composite meat slice gauging area, each element having a single opening, said opening being proximate the end thereof more remote from its spine part, said opening providing a space adjoining the element flat surface into which meat moving over said meat bearer area toward cutting relation with said cutter may protrude and an edge against and over which the thus protruding meat may be successively drawn to remove smear as the meat continues movement toward said cutter.

6. In combination with a meat treating machine having a housing, the housing having a meat treating station thereon, a meat bearing member on said housing having one end thereof more remote to said meat treating station than the other end and a plurality of flat surfaces laterally spaced over an area between said ends and in successively disposed relation to each other along straight lines extending between said ends, said flat surfaces being adapted on placement and pressure of meat thereagainst to withstand said pressure and slidably engage the meat for guiding it in movement relative to said housing and said meat treating station, said member having in each of said flat surfaces thereof an edge facing said one end of the member and in transverse relation to a straight line extending between the member ends and an opening adjacent said edge and one the side thereof most proximate said one end and providing a space into which a limited area of the meat face may bulge to occupy a position extending across said edge in response to the application of pressure to the meat for guiding and moving the same and whereby movement of the meat over said flat surfaces toward said other end of the member causes each bulging meat face area to engage and be scrapingly drawn over an edge and out of an opening, removing smear from that meat face area and permitting adjacently successive meat face areas to successively bulge into said openings for successive engagement of said edge and removal of smear.

7. A smear removal means for a meat slab or chunk comprising a holder and a unit having a lineally extending spine in connecting engagement with said holder and a plurality of flexible tine elements resiliently depending from and extending in parallel relation from successive spaced points along one of the longer sides of said spine in a normal angular relation thereto, each of said tine elements having an elongated substantially flat surface in plane with the corresponding surface of the other said tine elements and adapted for slidable and pressing engagement with a smear containing face of a meat slab or chunk whereby the tine elements and meat slab or chunk may be guided in relative movement and said meat slab or chunk may be compressed in distributed regions of tine engagement, each tine element having a circular opening at a point on said flat surface and proximate the end thereof remote from said spine, said opening providing an arcuate edge on each tine element in plane with said flat surface and in a facing spaced relation thereto, the diameter of each said opening allowing a limited area of a smear containing meat face in the compressed regions of the meat slab or chunk to expand between said flat surface and edge and bulge to one side of the common plane thereof and thus extend across said edge, whereby the relative movement of the tine elements and meat slab or chunk in a direction across the flat surfaces toward their aforesaid edges causes the bulging meat face areas in the openings of the tine elements to engage and be drawn scrapingly over said edges of the tine elements and back from one side of the common plane of said flat surfaces and edges toward and into said plane, removing smear simultaneously from said meat face areas and permitting adjacently successive meat face areas to successively expand and bulge between said flat surfaces and edges for successive removal of smear therefrom to effect, in a single pass of the meat slab or chunk relative to the unit, smear removal from a succession of meat face areas having strip or band continuity and outline.

8. The smear remover for a meat slab or chunk described in claim 7 having a plurality of units having the described spine and tine elements and being in connecting engagement with said holder in a tandem relation to said first mentioned unit and to each other, the tine elements of adjacent units being laterally offset with respect to one another, whereby the tine elements of adjacent units engage and compress different but overlapping regions of the meat slab or chunk and the tine elements of adjacent units remove smear from a succession of continuous areas.

9. The device described in claim 7 in which each flexible tine element has a pair of holes in its flat surface.

10. The smear remover described in claim 8 in which each of the tine elements has a pair of holes in its flat surface.

11. In combination with a power meat cutting machine having a housing and a cutter movably mounted on said housing, a slice gauging panel on said housing adapted to engage and guide meat into operative relation with said cutter, and having a plurality of resilient metal strips in engagement with spaced points on said panel, each strip having a leading edge and a flat surface with dimensions approximately equal to the distance between said spaced points and in a relation to the corresponding flat surfaces of the other strips to form a laterally extending meat bearer area therewith, each of said surfaces being provided with a hole, the edges of said hole forming a scraping surface when brought into compressive contact with already cut areas of the meat as the meat progresses toward the cutter.

12. The machine described in claim 11 in which each resilient metal strip has a pair of holes in its flat surface thereby providing additional scraping edges when brought into compressive relation with the cut surface of the meat.

13. In combination with a power meat cutting machine having a housing and a cutter movably mounted on said housing, a meat slice gauging panel on said housing adapted to engage and guide meat into cutting relation with said cutter and having a plurality of substantially lineally extending spine elements in engagement with said panel, each spine element being parallel to and in successive tandem relation with the other spine elements and having a plurality of resiliently depending and parallel finger elements along one of its longer sides, each finger element having a leading edge and a flat surface with dimensions approximately equal to the distance between alternate finger elements of the same and alternate spine elements on the panel, and in a relation to the corresponding leading edges and flat surfaces of the other finger elements to form therewith a laterally extending composite meat slice gauging area having a series of transverse parallel ridges formed by the aforementioned leading edges, each of said flat surfaces being provided with a hole, the edges of said hole being adapted to scrape smear from the cut meat surface as the meat is brought into compressive relation with said panel and as said meat progresses toward the cutter.

14. The machine described in claim 13 in which each of the finger elements has a pair of holes in its flat surface.

15. In combination with a power meat cutting machine having a housing and a cutter movably mounted on said housing, a slice gauging panel on said housing adapted to engage and guide meat into operative relation with said cutter and having a plurality of metal strips in engagement with spaced points on said panel, each strip having a flat surface with dimensions approximately equal to the distance between said spaced points and in a relation to the corresponding flat surfaces of the other strips to form a laterally extending meat bearer area therewith, each strip having a single opening in its flat surface midway the width thereof and providing space into which meat moving over said meat bearer area to engage the cutter may protrude and an edge on one side of said opening against and over which the protruding meat may be successively drawn to remove smear therefrom as the meat continues movement toward said cutter.

References Cited in the file of this patent

UNITED STATES PATENTS

| | | |
|---|---|---|
| 176,476 | Neff | Apr. 25, 1876 |
| 176,478 | Neff | Apr. 25, 1876 |
| 435,632 | Mohring | Sept. 2, 1890 |
| 519,890 | Mundell | May 15, 1894 |
| 524,420 | Jaeger | Aug. 14, 1894 |
| 663,303 | Sutton | Dec. 4, 1900 |
| 775,973 | Hibbard | Nov. 29, 1904 |
| 1,002,377 | Ekenborg Jr. | Sept. 5, 1911 |
| 1,384,742 | Clark | July 19, 1921 |
| 1,803,489 | Schueren | May 5, 1931 |
| 1,825,712 | Campbell | Oct. 6, 1931 |
| 1,872,887 | Casse | Aug. 23, 1932 |
| 2,016,596 | Hymel | Oct. 8, 1935 |
| 2,127,861 | Gandriaut | Aug. 23, 1938 |
| 2,169,707 | Obermeit | Aug. 15, 1939 |
| 2,280,621 | Biro | Apr. 21, 1942 |
| 2,449,092 | Struble | Sept. 14, 1948 |
| 2,489,483 | Czapar Jr. | Nov. 29, 1949 |

FOREIGN PATENTS

| | | |
|---|---|---|
| 592,610 | Great Britain | Sept. 23, 1947 |

OTHER REFERENCES

Smear Remover Space Guide for Power Meat Saws, U. S. Dept. of Agriculture, Production and Marketing Administration, Washington, D. C., dated May 2, 1952.